US011871876B2

(12) United States Patent
Bouvet et al.

(10) Patent No.: US 11,871,876 B2
(45) Date of Patent: Jan. 16, 2024

(54) REMOVABLE HANDLE HAVING AN OPTIMIZED ASSEMBLY

(71) Applicant: SEB S.A., Ecully (FR)

(72) Inventors: Michel Bouvet, Rumilly (FR); Denis Gruaz, Villaz (FR); Michel Montgelard, Aix-les-Bains (FR)

(73) Assignee: SEB S.A.

( * ) Notice: Subject to any disclaimer, the term of this patent is extended or adjusted under 35 U.S.C. 154(b) by 121 days.

(21) Appl. No.: 17/543,945

(22) Filed: Dec. 7, 2021

(65) Prior Publication Data

US 2022/0211218 A1   Jul. 7, 2022

(30) Foreign Application Priority Data

Jan. 7, 2021   (FR) ........................... 2100139

(51) Int. Cl.
  *A47J 45/07*   (2006.01)
(52) U.S. Cl.
  CPC .................. *A47J 45/071* (2013.01)
(58) Field of Classification Search
  CPC .................................................. A47J 45/071
  USPC ...................... 220/573.1, 753, 759
  See application file for complete search history.

(56) References Cited

U.S. PATENT DOCUMENTS

| 7,611,179 | B2 * | 11/2009 | Lorthioir | A47J 45/10 |
| | | | | 220/759 |
| 11,612,274 | B2 * | 3/2023 | Montgelard | A47J 45/071 |
| | | | | 220/573.1 |
| 2006/0081136 | A1 | 4/2006 | Lorthioir et al. | |
| 2009/0045207 | A1 * | 2/2009 | Lorthioir | A47J 45/10 |
| | | | | 220/759 |

FOREIGN PATENT DOCUMENTS

| EP | 1523264 | B1 | 11/2005 | |
| EP | 2484256 | A1 | 8/2012 | |
| EP | 2494896 | A1 | 9/2012 | |
| EP | 3345520 | A1 * | 7/2018 | ............. A47J 45/07 |
| EP | 3319497 | B1 | 5/2019 | |
| FR | 2977786 | A1 * | 1/2013 | ............. A47J 45/071 |
| WO | WO-2011080482 | A1 * | 7/2011 | ............. A47J 45/00 |

OTHER PUBLICATIONS

French Search Report for Application No. FR 2100139, dated Sep. 17, 2021, 2 pages.

* cited by examiner

*Primary Examiner* — J. Gregory Pickett
*Assistant Examiner* — Niki M Eloshway
(74) *Attorney, Agent, or Firm* — Lerner David LLP

(57) ABSTRACT

A removable handle for a cooking container having a side wall extending upward by an outwardly curved portion including a free end, the removable handle extending in a longitudinal direction and including an internal support member and an external support member designed to rest against, respectively, an inner surface and an outer surface of the side wall, an upper support member designed to rest against the free end, a lock movable in translation between an open position and a closed position, with the lock including a blocking wall designed to be separated from the internal support member when the lock is in the open position and designed to generate a force on the free end when the lock is in the closed position, a gripping body that extends along the longitudinal direction and a structural part that includes the internal support member and the upper support member.

11 Claims, 7 Drawing Sheets

[Fig. 1]
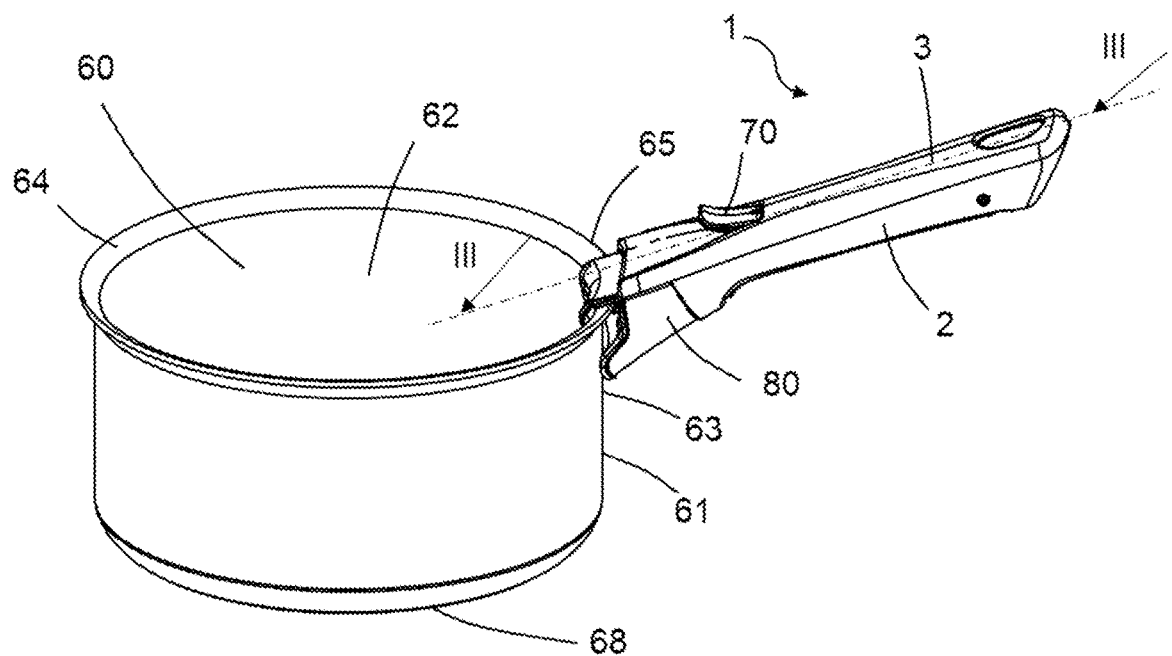

[Fig. 2]
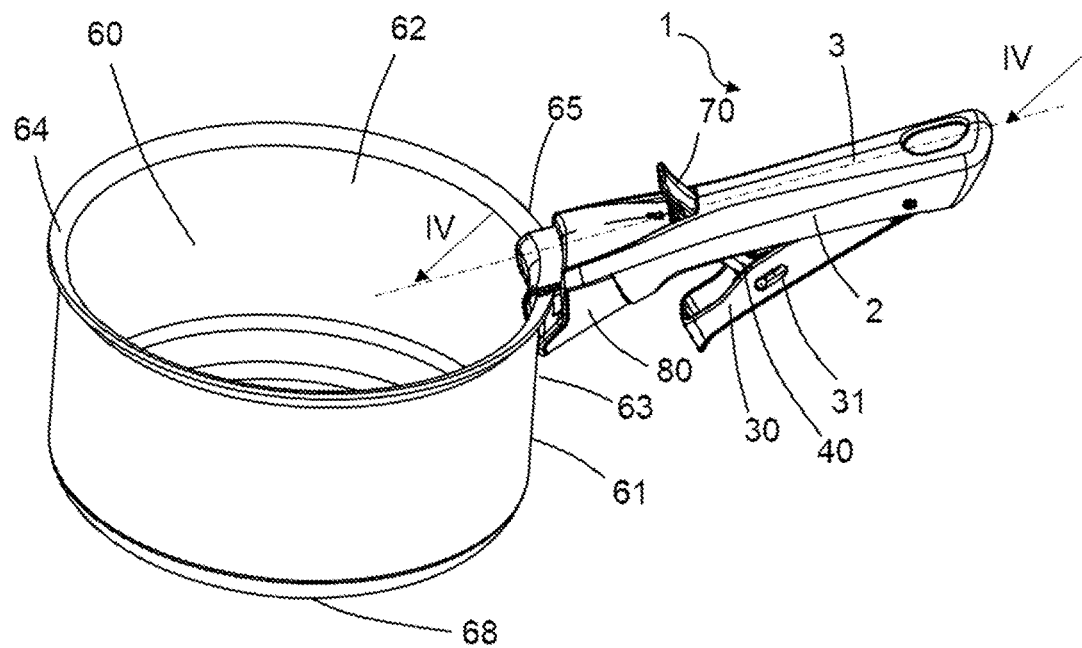

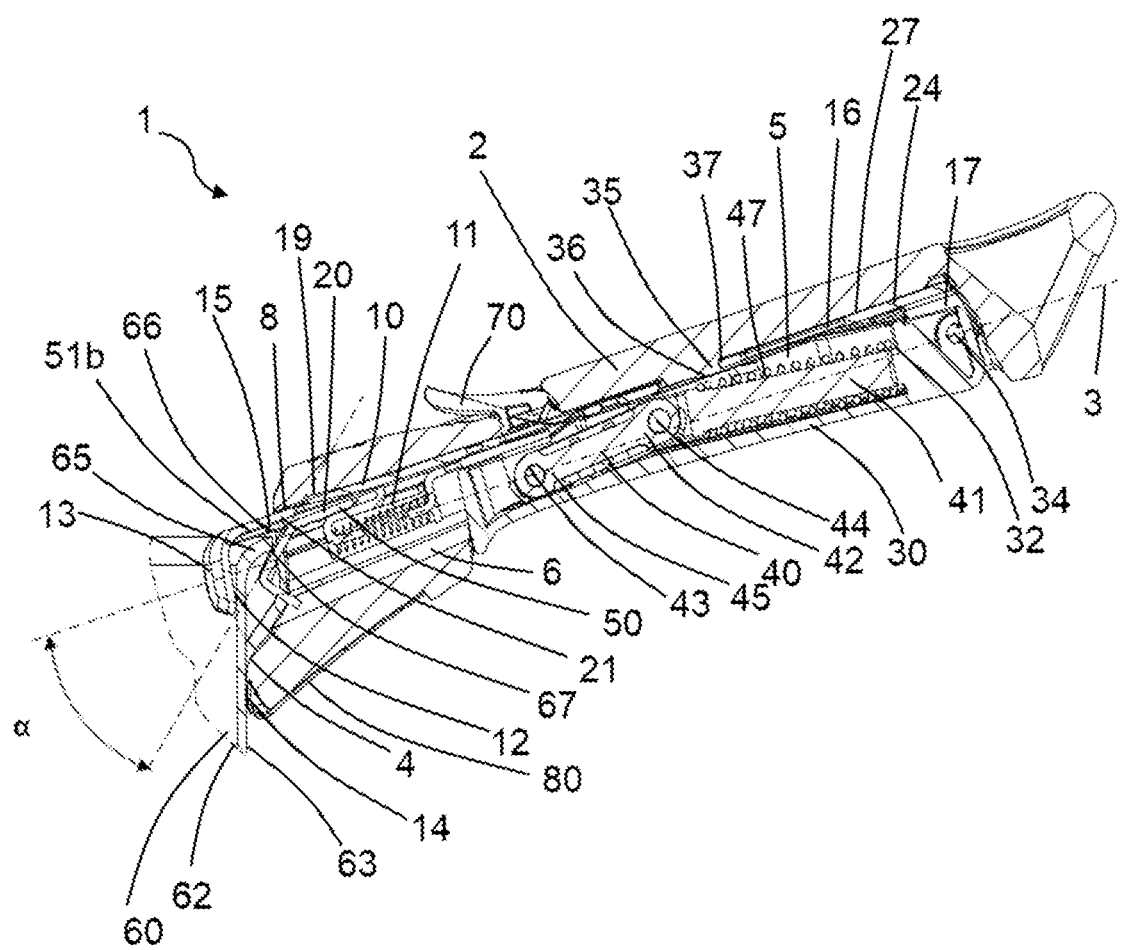
[Fig. 3]

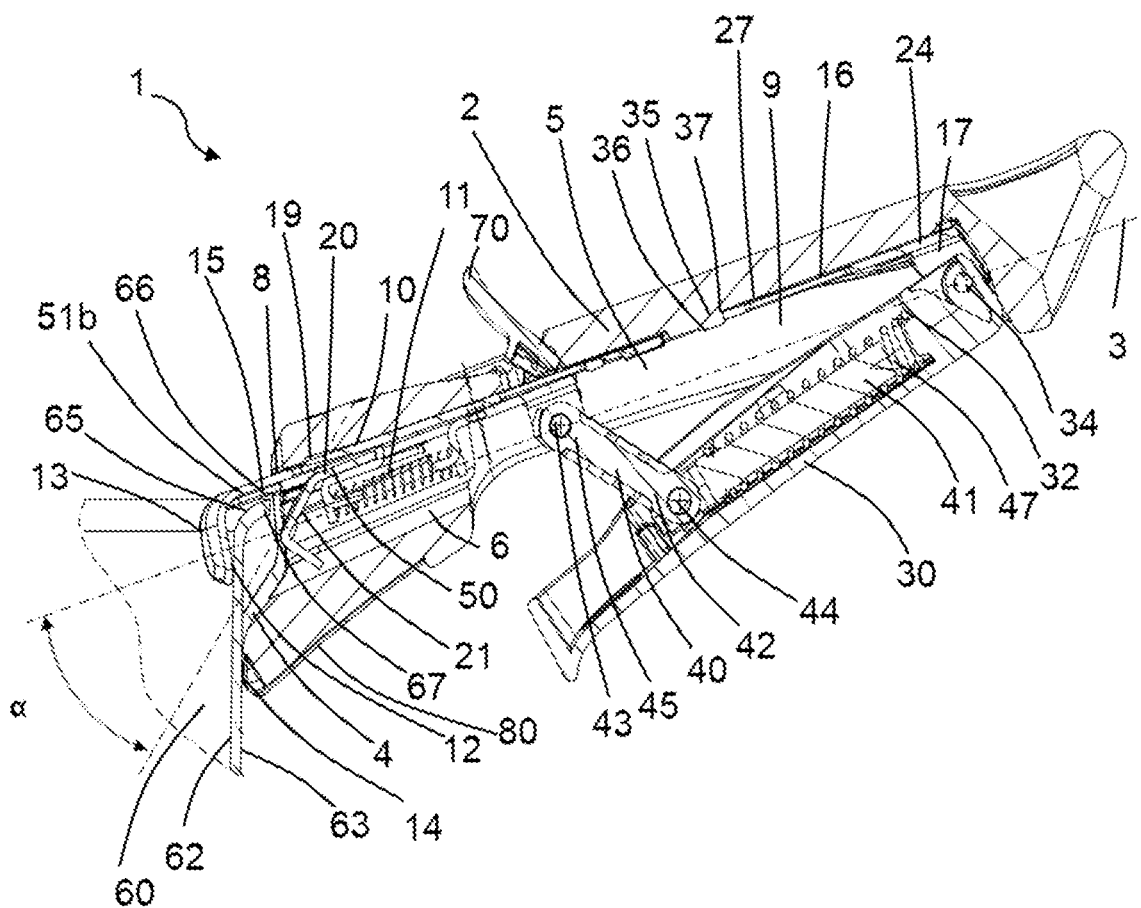
[Fig. 4]

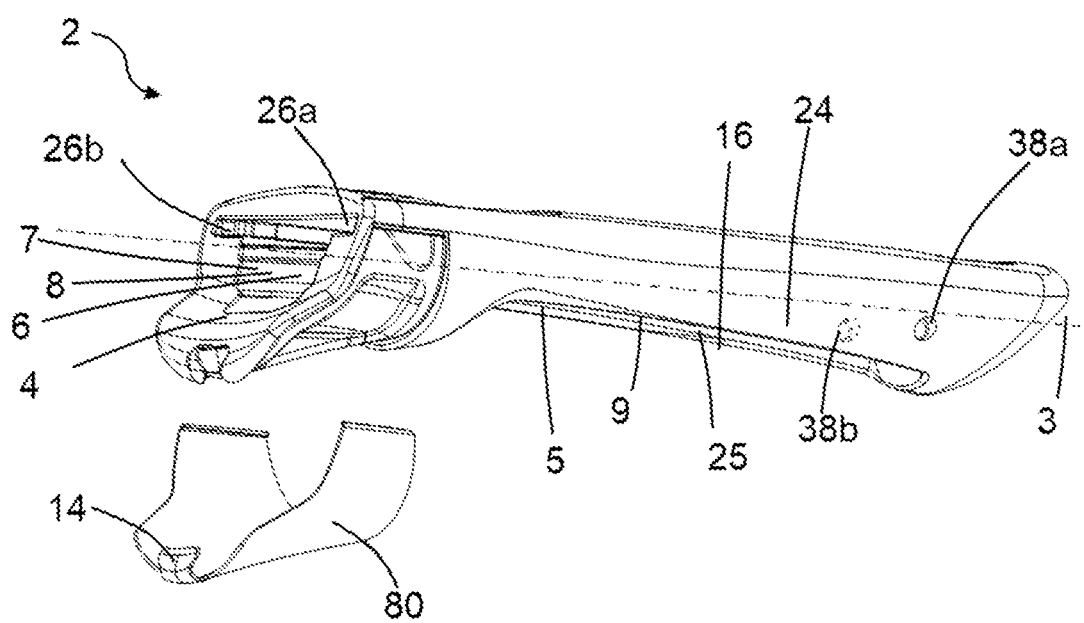
[Fig. 5]

[Fig. 6]
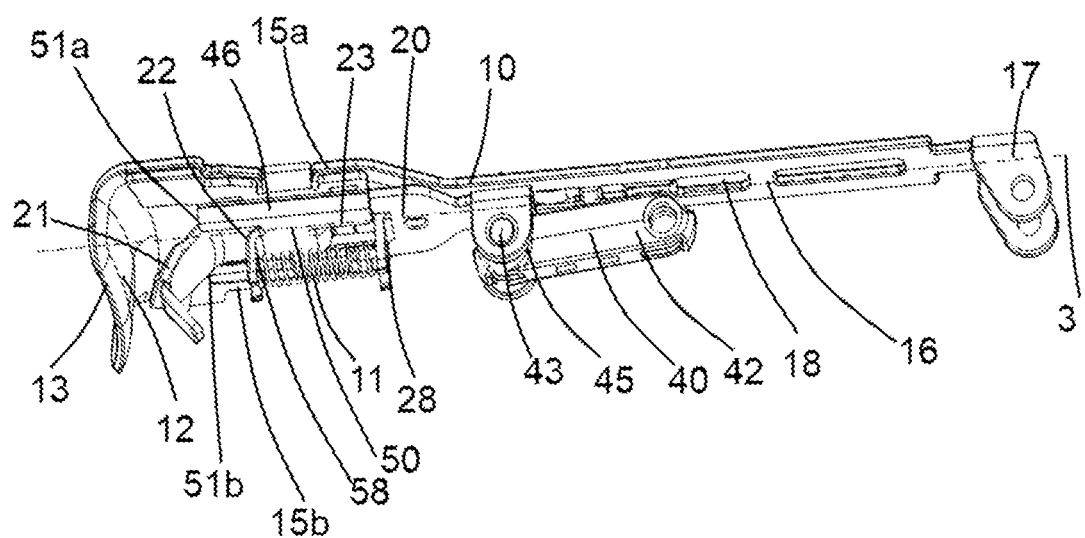

[Fig. 7]
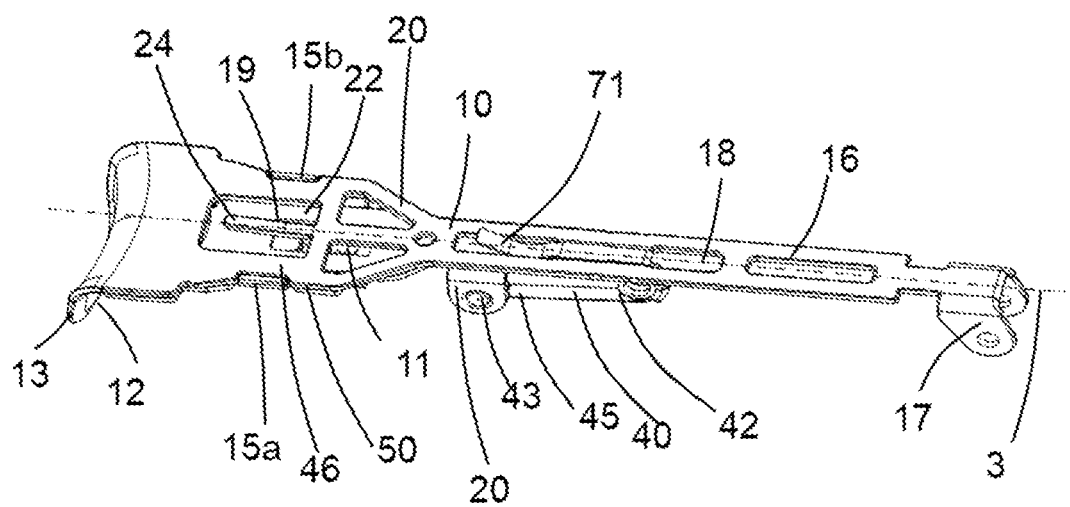

REMOVABLE HANDLE HAVING AN OPTIMIZED ASSEMBLY

CROSS-REFERENCE TO RELATED APPLICATIONS

This application claims priority from French application number 2100139, filed Jan. 7, 2021, the disclosure of which is hereby incorporated herein by reference.

TECHNICAL FIELD

This invention consists of a removable handle designed to work with a cooking container, such as a saucepan, a frying pan or a stewpot, with a side wall that is extended upward by an outwardly curved portion.

STATE OF THE ART

Document EP3319497 discloses a removable handle designed to work with a cooking container having a side wall that is extended upward by an outwardly curved portion comprising a free end. The removable handle extends in a longitudinal direction and includes an internal support member and an external support member designed to rest against, respectively, an inner surface and an outer surface of the side wall, as well as an upper support member designed to rest against the free end of the curved portion. The removable handle includes a lock that is movable between an open position and a closed position, the lock comprising a blocking wall designed to be separated from the internal support member when the lock is in the open position and designed to generate a force on the free end when the lock is in the closed position, under the action of a means of pressurization. The removable handle includes a gripping body that extends along the longitudinal direction and a structural part that includes the internal support member and the upper support member.

The assembly of such a removable handle is done by associating the various parts in the gripping body in several directions, which requires inversions of the gripping body.

Moreover, the assembly of the structural part and the lock on the gripping body is done by screwing. Thus, the assembly of such a removable handle with screwing and inversion operations of the gripping body is very difficult to automate. A screwing operation may also cause problems of operational reliability of the removable handle over time, if the screw becomes progressively loosened.

SUMMARY OF THE INVENTION

This invention is intended to remedy these disadvantages.

The technical problem at the root of the invention consists in proposing a removable handle intended to cooperate with a cooking container that is of simple design and economical to implement.

Another purpose of the invention is to propose a removable handle that has reliable operation over time.

To that end, an object of the invention is a removable handle designed to cooperate with a cooking container having a side wall that extends upward by an outwardly curved portion comprising a free end, said removable handle extending in a longitudinal direction and including an internal support member and an external support member designed to rest against, respectively, an inner surface and an outer surface of the side wall, as well as an upper support member designed to rest against the free end of the curved portion, said removable handle comprising a lock movable in translation between an open position and a closed position, the lock comprising a blocking wall designed to be separated from the internal support member when the lock is in the open position and designed to generate a force on the free end when the lock is in the closed position, under the action of a means of pressurization, said removable handle comprising a gripping body that extends along the longitudinal direction and a structural part that comprises the internal support member and the upper support member, characterized such that the structural part and the lock form a subassembly and such that the gripping body includes a housing for receiving the subassembly, the housing comprising an insertion orifice arranged in a front face of the gripping body and dimensioned to allow the assembly of the subassembly in the gripping body by insertion along the longitudinal direction.

Thus, producing a subassembly makes it possible to control the operation of the lock relative to the gripping body. Moreover, the insertion of the subassembly along the longitudinal direction is a simple assembly movement.

Advantageously, the gripping body comprises the external support member.

Thus, the structural part that does not include the external support member is more compact.

Preferably, the removable handle comprises a clip attached to the structural part in order to define a housing for receiving and guiding the lock in translation, the clip forming part of the subassembly.

Such a design makes it possible to guarantee good guidance of the lock on the structural part.

Advantageously, the structural part and the clip are made of a metal material, the clip being welded onto the structural part.

The welding enables the assembly of the clip on the structural part to be maintained in a precise and stable manner over time. Furthermore, the lock is guided in its movement in translation between two metal parts that are used very little over time.

Advantageously, the lock is made of a metal material.

Thus, the metal lock moves in translation in a guide produced with metal parts. Such a construction is robust and durable.

Preferably, the housing comprises a tubular portion that extends along the longitudinal direction and one free end of which opens onto the front wall in order to form the insertion orifice.

A tubular portion is very strong, particularly at the external support member, and makes it possible to surround the subassembly to hold it in position once inserted into the gripping body.

Advantageously, the housing comprises two upper side grooves and the structural part comprises two side wings, the two side wings being intended to slide in the two grooves during insertion of the subassembly into the housing.

Thus, the subassembly is properly guided during its insertion into the gripping body and is retained securely in a direction transverse to the longitudinal direction after insertion.

Preferably, the removable handle comprises a self-locking device of the subassembly in the gripping body at the end of insertion.

By self-locking device, it is understood that the subassembly and the gripping body are secured together at the end of insertion, without adding another part or additional operation. Such a device is particularly economical.

Advantageously, the structural part comprises a lamina provided with a transverse opening and the housing comprises a lug, the lamina having the transverse opening and the lug forming the self-locking device of the subassembly in the gripping body.

Advantageously, the removable handle comprises means of maneuvering the toggle lock comprising a lever mounted [so as to be] movable in rotation on the structural part and on the gripping body.

Preferably, the housing comprises an inverted U-shaped portion that extends along the longitudinal direction, said inverted U-shaped portion comprising a lower opening for insertion of the lever.

Advantageously, the means of maneuvering the toggle lock comprises a connecting rod and a compression spring forming the pressurization means.

The pushing of the spring on the lock takes place along the longitudinal direction when the lock is in the closed position. This arrangement makes it possible to adapt the position of the lock to the thickness and length of the free end.

The invention also relates to a cooking container comprising a side wall that is extended upward by an outwardly curved portion comprising a free end having an upper edge and a lower edge and equipped with a removable handle as described above.

BRIEF DESCRIPTION OF THE FIGURES

The purposes, aspects and advantages of this invention, according to the description given below of a particular embodiment of the invention presented by way of non-limiting example, will be better understood by referring to the attached drawings in which:

FIG. 1 is a perspective view of a removable handle fitted to a cooking container according to a particular embodiment of the invention, the lock being in the closed position;

FIG. 2 is a perspective view of the removable handle fitted to a cooking container of FIG. 1, the lock being in the open position;

FIG. 3 is a cross-sectional view of the removable handle along the median vertical cross-section plane III-III of FIG. 1;

FIG. 4 is a cross-sectional view of the removable handle along the median vertical cross-section plane IV-IV of FIG. 2;

FIG. 5 is a perspective view of the gripping body of the removable handle illustrated in FIG. 1;

FIG. 6 is a perspective view from below of the subassembly formed by the structural part, the clip, the lock and the connecting rod of the removable handle illustrated in FIG. 1;

FIG. 7 is a perspective view from above of the subassembly illustrated in FIG. 6.

Only those elements required in order to understand the invention have been depicted. In order to facilitate interpretation of the drawings, the same elements are labeled with the same references across all the figures.

It should be noted that in this document, the terms "horizontal", "vertical", "lower", "upper", "top", "bottom", "front", "rear", "longitudinal", "transverse", used to describe the removable handle, refer to this removable handle when positioned for use, when it is fitted onto a cooking container resting flat on a working surface.

As can be seen in FIGS. 1 to 4, a removable handle 1 is designed to work with a cooking container 60, which comprises a horizontal bottom wall 68, a side wall 61 rising from the bottom wall 68, and an outwardly curved portion 64 that extends toward the exterior. The side wall 61 comprises an inner surface 62 and an outer surface 63. The curved portion 64 extends the side wall 61 and delimits the upper opening of the cooking container 60. The curved portion 64 comprises a free end 65 provided with an upper edge 66 and a lower edge 67 (FIGS. 3 and 4). The upper edge 66 and lower edge 67 are preferably superimposed in a vertical plane.

The removable handle 1 extends in a longitudinal direction 3. The removable handle 1 comprises a gripping body 2, which comprises, at a front end turned toward the cooking container 60, a front face 4 forming an external support member 14 designed to cooperate with the outer surface 63 of the side wall 61. In a vertical cross-section plane oriented in the longitudinal direction 3 (FIGS. 3 and 4), the external support member 14 is substantially vertical. The gripping body 2 comprises a metal reinforcement 80 that serves as flame guard and comprises the external support 14. The removable handle 1 comprises a median vertical plane that extends along the longitudinal direction 3 and forms a plane of symmetry for the removable handle 1.

According to FIGS. 3, 4, 6 and 7, the removable handle 1 has a clip 50 made of metal material. The clip 50 comprises two tabs 51a, 51b arranged on either side of a vertical median plane. The two tabs 51a, 51b form an upper support member 15 designed to cooperate with the upper edge 66 of the free end 65 (FIG. 3). The two tabs 51a, 51b extend along the longitudinal direction 3, at the front end.

The removable handle 1 comprises a structural part 10 made of metal material. The structural part 10 is substantially flat and comprises an end tab 13. The end tab 13 extends downward and comprises an inner wall forming an internal support member 12 designed to cooperate with the inner surface 62 of the side wall 61.

The internal support member 12 and the external support member 14 are offset in the longitudinal direction 3 (FIG. 3) to allow the insertion of the side wall 61 and the free end 65 during the assembly of the removable handle 1 on the cooking container 60.

The removable handle 1 comprises a locking member formed by a lock 20 movable in translation in the longitudinal direction 3 between an open position (FIG. 4) and a closed position (FIG. 3). The lock 20 comprises a blocking wall 21 at the front end. As can be seen in FIG. 4, when the lock 20 is in the open position, the blocking wall 21 is designed to be separated from the upper support member 15 to enable the insertion of the side wall 61 between the internal support member 12 and the external support member 14 and to allow the upper edge 66 of the free end 65 to rest against the upper support member 15.

As can be seen in FIG. 3, when the lock 20 is in the closed position, the blocking wall 21 is designed to rest against the lower edge 67 of the free end 65 and thus block the upper edge 66 against the upper support member 15. In a vertical cross-section plane comprising the longitudinal direction 3, a straight line at the blocking wall 21 and the longitudinal direction form an angle α of between 40 and 50°, preferably 45°.

As can be seen in FIG. 6, the removable handle 1 comprises a return means of the lock 20 placed between a tab 58 borne by the clip 50 and a stop 28 borne by the lock 20. The return means is formed by a spring 11. The spring 11 works under compression when the lock 20 is in the closed position. The spring 11 is adapted to apply a return force on the stop 28 in order to pull the lock 20 toward its open position.

According to FIGS. 3 and 4, the removable handle 1 comprises means of moving the locking member formed by the lock 20. The means of movement comprise a lever 30 mounted pivotally on the structural part 10 and the gripping body 2 around a pivot pin 34 extending in a transverse direction, perpendicular to the longitudinal direction 3, and a connecting rod 40 that enables the movement of the lock 20 when the lever 30 is pivoted. The connecting rod 40 is mounted pivotally by a first end 45 to the lock 20 around a pin 43, and by a second end 42 to the lever 30 around a pin 44 that is mounted so as to slide in an oblong opening 31 made in the lever 30 (FIG. 2).

The lever 30 is movable between a closed position and an open position after moving through an intermediate position of unstable balance. When the lever 30 is in the closed position the lock 20 is in the closed position, and when the lever 30 is in the open position the lock 20 is in the open position. Furthermore, the means of movement also comprise a spring 47 arranged on a rod 41. The pin 44 is inserted into the rod 41 and into the oblong opening 31. The spring 47 is mounted so as to slide on the rod 41 and rests on a transverse wall 32 of the lever 30. This compression spring 47 forces back the pin 44 via the rod 41 to enable the position of the lock 20 in a closed position to adjust to the thickness of the side wall 61 of the cooking container 60.

According to FIG. 3, when the lever 30 is in the closed position, the pin 44 around which the second end 42 pivots is located above a line passing through the pivot pin 34 and the pin 43. The second end 42 is held in contact with the structural part 10 under the action of the compression spring 47. Thus, the lock 20 naturally stays in its closed position, without the user having to maintain any effort on the removable handle 1. The intermediate position with unstable balance of the lever 30 is reached when the pin 44 around which the second end 42 pivots is moved under the line passing through the pivot pin 34 and the pin 43.

As can be seen in FIGS. 6 and 7, the structural part 10, the clip 50 and the lock 20 form a subassembly. The lock 20 comprises a substantially flat central portion 22 that extends along the longitudinal direction 3. The clip 50 covers the central portion 22 of the lock 20 and is attached to the structural part 10 by laser welding. The clip 50 and the structural part 10 form a housing 23 for receiving and guiding in translation the lock 20. The subassembly also comprises the spring 11, the connecting rod 40 and the pin 43.

The structural part 10 provided with the clip 50 comprises a part 46 provided with two side wings 15a, 15b (FIG. 7) arranged in proximity to the end tab 13. The structural part 10 comprises a part in the form of a lamina 16 that extends along the longitudinal direction 3 from the part 46 provided with two side wings 15a and 15b up to a rear end that comprises an inverted U-shaped yoke 17. The lamina 16 comprises a through-opening 18, arranged in proximity to the rear end. The structural part 10 comprises a tab 19 (FIG. 7) provided with a free end 24 deformed upward, transverse to the longitudinal direction 3.

As can be seen in FIG. 5, the gripping body 2 comprises a housing 5 for receiving the subassembly. The housing 5 comprises a tubular portion 6 that extends along the longitudinal direction 3 and a free end 7 whereof opens onto the front face 4 in order to form an insertion orifice 8. The insertion orifice 8 is arranged above the external support member 14. The housing 5 comprises an inverted U-shaped portion 9 that extends along the longitudinal direction 3 in the extension of the tubular portion 6. The inverted U-shaped portion 9 comprises a lower opening 25 for insertion and reception of the lever 30. The housing 5 in the tubular portion 6 comprises two upper side grooves 26a and 26b that extend along the longitudinal direction 3. The two side wings 15a and 15b of the structural part 10 are designed to slide in the two grooves 26a and 26b during insertion of the subassembly into the housing 5, more particularly into the tubular portion 6. The housing 5 comprises an upper face 27 provided with a lug 35 (FIGS. 3 and 4). The lug 35 is arranged in the inverted U-shaped portion 9. The lug 35 comprises a sloped face 36 designed to bend the lamina 16 elastically during assembly until the lug 35 penetrates into the through-opening 18 at the end of insertion. The lug 35 comprises a vertical face 37 that cooperates with the through-opening 18 to prevent the extraction of the subassembly of the gripping body 2. The lamina 16 provided with the through-opening 18 and the lug 35 form a self-locking device of the subassembly in the gripping body 2. The assembly of the lever 30 is achieved by inserting along a transverse direction, perpendicular to the longitudinal direction 3, the pin 34 into two perforations 38a and 38b (FIG. 5) of the gripping body 2 in the yoke 17 and in the lever 30. Such an assembly ensures that the lug 35 is held in position in the through-opening 18.

As can be seen in FIGS. 1 to 4, the removable handle 1 comprises an opening button 70 that enables the lever 30 to be moved from its initial closed position to beyond its intermediate position with unstable balance. The opening button 70 is arranged on an upper face of the gripping body 2. The opening button 70 is movable in rotation around a transverse axis, horizontal to the longitudinal direction 3 of the removable handle 1. The opening button 70 is movable between a lowered resting position in which the lever 30 is in its closed position, an intermediate raised position in which the lever 30 is in its intermediate position of unstable balance and a raised position in which the lever 30 is in its open position. A spring 71 (FIG. 7) for retaining the opening button 70 in its raised position is arranged on the structural part 10.

In order to assemble the removable handle 1, the opening button 70 and the metal reinforcement 80 are arranged on the gripping body 80. A subassembly is then formed by positioning the lock 20 on the structural part 10 and by covering the central portion 22 of the lock 20 with the clip 50. The clip 50 and the structural part 10 are secured together by laser welding. The subassembly is completed with the spring 11, the connecting rod 40 and the pin 43. The subassembly is then inserted through the orifice 8 into the housing 5 of the gripping body 2. The two side wings 15a and 15b of the structural part 10 slide into the two grooves 26a and 26b and the lamina 16 is deformed downward by sliding along the sloped face 36 of the lug 35. At the end of insertion, the lug 35 penetrates into the through-opening 18 and the upwardly deformed free end 24 of the tab 19 comes to rest on the upper face 27 of the housing 5 in order to compensate for the clearances between the two side wings 15a and 15b of the two grooves 26a and 26b. The lever 30 equipped with the rod 41 and the spring 47 is inserted into the inverted-U portion 9, then the pin 34 is slid into the two perforations 38a and 38b of the gripping body 2, in the yoke 17 in such a way as to secure it in the lever 30. The assembly is completed by inserting the pin 44 into the oblong opening 31 to secure it in the rod 41. Thus, the assembly of the removable handle 1 is achieved by a succession of operations that can be done in an automated way.

Of course, the invention is in no way limited to the described and illustrated embodiment, which was only provided by way of example. Changes can still be made, particularly with regard to the constitution of the various elements or by substituting technical equivalents, without departing from the scope of protection of the invention.

Thus, in one alternative embodiment not shown, the clip comprises two side tabs and the clip is assembled onto the structural part by crimping the two tabs onto the structural part.

The invention claimed is:

1. A removable handle configured to cooperate with a cooking container, the cooking container having a side wall that is extended upward by an outwardly curved portion including a free end, the removable handle extending in a longitudinal direction and comprising:
    a structural part comprising an internal support member configured to rest against an inner surface of the side wall and an upper support member configured to rest against the free end of the curved portion;
    a lock movable in translation between an open position and a closed position, the lock comprising a blocking wall configured to be separated from the internal support member when the lock is in the open position and configured to generate a force on the free end when the lock is in the closed position, wherein the structural part and the lock form a subassembly; and
    a gripping body extending along the longitudinal direction, wherein the gripping body comprises a housing for receiving the subassembly, the housing comprising an insertion orifice arranged in a front face of the gripping body, the insertion orifice dimensioned for the subassembly to be inserted into the housing through the insertion orifice along the longitudinal direction.

2. The removable handle according to claim 1, wherein the gripping body comprises an external support member configured to rest against an outer surface of the side wall.

3. The removable handle according to claim 1, wherein the subassembly further comprises a clip attached to the structural part to define a housing for receiving and guiding in translation the lock.

4. The removable handle according to claim 3, wherein the structural part and the clip are made of a metal material, the clip being welded onto the structural part.

5. The removable handle according to claim 1, wherein the housing comprises a tubular portion that extends along the longitudinal direction, one end of the tubular portion opening onto the front face to form the insertion orifice.

6. The removable handle according to claim 1, wherein the housing comprises two upper side grooves and the structural part comprises two side wings, the two side wings configured to slide in the two upper side grooves during the insertion of the subassembly into the housing.

7. The removable handle according to claim 1, wherein the subassembly further comprises a self-locking device, to automatically lock the subassembly in the gripping body at the end of insertion.

8. The removable handle according to claim 1, further comprising a lever configured to maneuver the lock, the lever being mounted pivotally on the structural part and on the gripping body.

9. The removable handle, according to claim 8, wherein the housing comprises an inverted U-shaped portion that extends along the longitudinal direction, the inverted U-shaped portion comprising a lower opening for insertion of the lever.

10. The removable handle according to claim 8, wherein the subassembly comprises a connecting rod and a compression spring for, via pressurization, generating the force on the free end when the lock is in the closed position.

11. An assembly comprising:
    at least one cooking container comprising a side wall that is extended upward by an outwardly curved portion including a free end with an upper edge and a lower edge; and
    a removable handle according to claim 1.

* * * * *